Patented Dec. 13, 1949

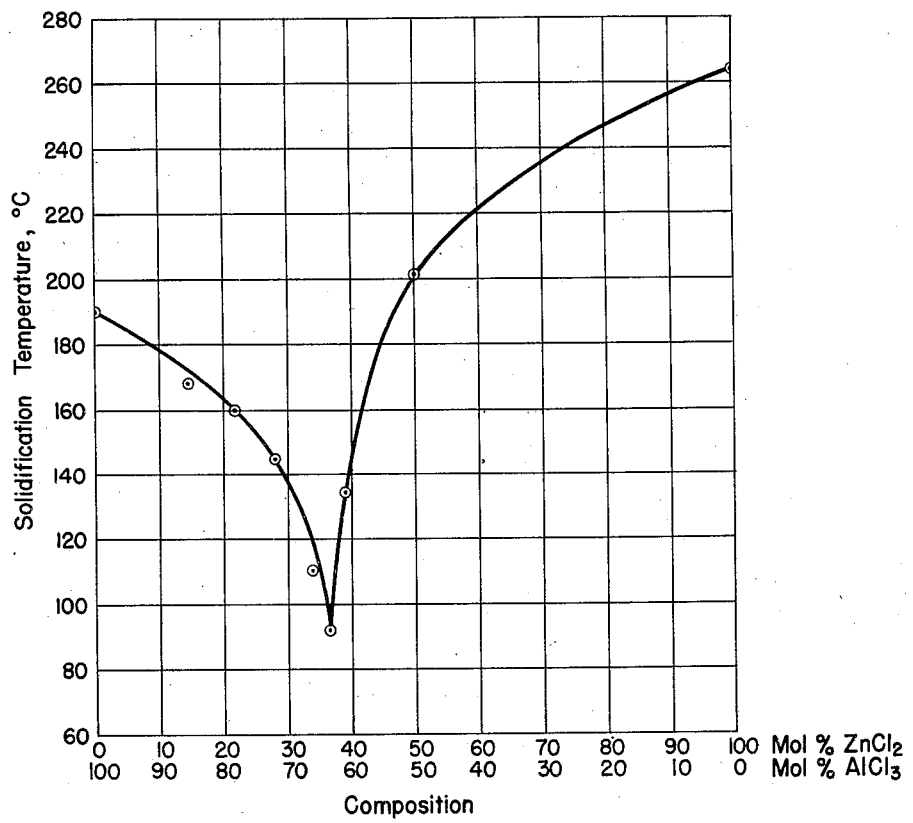

2,490,853

UNITED STATES PATENT OFFICE 2,490,853

ISOMERIZATION OF SATURATED HYDROCARBONS

Herman S. Bloch, Chicago, Ill., assignor to Universal Oil Products Company, Chicago, Ill., a corporation of Delaware Application September 17, 1947, Serial No. 774,623

6 Claims. (Cl. 260—666)

This application is a continuation-in-part of my application Serial No. 380,130, filed February 24, 1941, now abandoned.

This invention relates to the isomerization of saturated hydrocarbons in the presence of a catalyst comprising a molten mixture of an aluminum halide and a zinc halide.

The catalytic isomerization of saturated hydrocarbons has assumed great importance in recent years. For example, the isomerization of normal butane to the more reactive isobutane is conducted commercially on an extended scale. The isobutane is alkylated with olefins such as propylene, butylenes, and amylenes to produce branched chain hydrocarbons of high antiknock values that are particularly useful in aviation gasoline blends. The isomerization of normally liquid paraffinic and cycloparaffinic hydrocarbons such as normal pentane, hexane, and heptane, methyl cyclopentane, straight run naphthas, and the like, to compounds having more desirable antiknock and chemical properties is being practiced on an increasing scale.

The most widely used isomerization processes employ as the catalyst a Friedel-Crafts metal halide, which is either supported on an inert carrier or is in the form of a semifluid complex with hydrocarbons. I have invented an improved isomerization process that utilizes certain Friedel-Crafts metal halides in a state different from those just mentioned.

In one embodiment my invention relates to an isomerization process which comprises subjecting an isomerizable saturated hydrocarbon, at an isomerizing temperature below about 200° C., to the action of a catalyst comprising a mixture of a major mol proportion of an aluminum halide and a minor mol proportion of a zinc halide, said halides being so proportioned that the mixture is molten at said isomerizing temperature.

My process possesses several advantages. One such advantage is that the catalyst, when used at the proper operating conditions, is very active and highly selective. Another is that, because of the molten condition of the catalyst, my process can be carried out simply and inexpensively without resorting to complicated and costly methods of operation. For example, if batch operation is employed, the molten catalyst and the hydrocarbon to be isomerized need only be contacted in a suitable vessel such as a rotating autoclave. If continuous operation is desired, the hydrocarbon charge may be continuously bubbled upwardly, either as a vapor or as a liquid, through the molten mixture and the isomerized product continuously recovered. Again, the hydrocarbon may be passed upwardly and countercurrently to a descending stream of catalyst in a reactor equipped with suitable contacting elements such as Berl saddles, quartz chips, chain, trays, or the like. This system should provide for recycle of the catalyst from the bottom to the top of the reactor. Still another mode of continuous operation comprises passing a proportioned amount of hydrocarbon and molten catalyst through tubular elements at suitable conditions of temperature, pressure, and flow rate, continuously separating the catalyst from the products, and recycling the catalyst to the tubular elements. A similar type of operation may be employed wherein other types of contactors are used.

Saturated hydrocarbons that may be isomerized in my process include paraffins such as normal butane, normal pentane, and normal hexane; cycloparaffins having at least six carbon atoms in the molecule and containing at least five carbon atoms in the ring such as methyl cyclopentane; and straight run naphthas that contain appreciable quantities of isomerizable paraffins and naphthenes.

The catalysts used in my process comprise mixtures containing a major mol proportion of an aluminum halide and a minor mol proportion of a zinc halide. The preferred catalyst is that in which the aluminum halide is aluminum chloride and the zinc halide is zinc chloride. It can be seen from the figure in which solidification temperature is plotted against composition for the system $AlCl_3$—$ZnCl_2$, that an equimolecular mixture of these salts has a solidification temperature of approximately 200° C. All compositions containing more than this proportion of aluminum halide have solidification temperatures lower than about 200° C. On the other hand, all compositions containing less than this proportion of aluminum chloride have solidification temperatures greater than about 200° C.

I limit the composition of my catalyst to mixtures containing a major mol proportion of aluminum halide, i. e., to mixtures that are molten below 200° C., because I have found that 200° C. is about the maximum temperature at which isomerization of saturated hydrocarbons can be effected without appreciable side reactions such as cracking. The minimum temperature at which my process should be conducted is a temperature slightly higher than the solidification temperature of the particular salt mixture being employed. Thus, the catalyst is always molten in my process, which means that it is always in its most active state; for it is substantially less active and has a shorter active life when it is in the solid state.

The mixtures of aluminum and zinc chlorides in the range of compositions that are molten below 200° C. are unusual in the respect that, although they form a double salt and exhibit low aluminum chloride vapor pressures, they have substantially the same activity for isomerization as an equivalent amount of aluminum chloride. In contrast thereto, mixtures of aluminum chloride with other metal halides that form double salts therewith, such as alkali metal halides, are substantially less active for isomerization than an equivalent amount of aluminum chloride.

The use of hydrogen halides such as hydrogen chloride in my process occasionally has a beneficial effect on catalyst activity and life. The amount of hydrogen halide employed ordinarily will be within the range of from about 1 to about 25 mol per cent of the hydrocarbon charge.

Pressure is not a critical variable in my process since isomerization is effected whether the charge is present as a liquid or as a vapor. However, because of engineering considerations, superatmospheric pressures usually are employed.

The reaction time may lie within the range of from several minutes to several hours. However, in order to obtain appreciable conversion, the reaction time should be at least 30 minutes.

The following examples are given to illustrate my invention, but they are not introduced for the purpose of unduly limiting said invention.

Example I

Normal butane was continuously isomerized by bubbling it upwardly through a pool of molten mixed metal halides consisting of 35 mol per cent zinc chloride and 65 mol per cent aluminum chloride. The temperature was 125° C., the pressure was 150 p. s. i. g., and the butane feed rate was 1.0 volume of liquid butane per volume of catalyst per hour. Hydrogen chloride was charged along with the butane; the amount was equal to 7.5 mol per cent of the feed. After 18 hours of operation, the composition of the effluent gas mixture was as shown in the following table.

| Constituent | Volume, Per Cent |
|---|---|
| Methane+Ethane | 0.14 |
| Propane | 33.2 |
| Isobutane | 28.8 |
| Normal Butane | 33.9 |
| Pentanes and Higher | 4.1 |

After 24 hours of operation, hydrogen was introduced at the rate of 2.5 mol per cent of the butane charged, which corresponded to a hydrogen partial pressure in the reaction zone of about 4 pounds. After 8 more hours of operation, the analysis of the effluent gases corresponded to that shown below.

| Constituent | Volume, Per Cent |
|---|---|
| Methane and Ethane | 0.16 |
| Propane | 1.0 |
| Isobutane | 32.5 |
| Normal Butane | 65.0 |
| Pentanes and Higher | 1.5 |

It can be seen from the foregoing data that the catalyst possessed high isomerizing activity and that the presence of hydrogen aided the selectivity thereof.

Example II

Cyclohexane was isomerized to methyl cyclopentane by contacting it in a rotating autoclave with a molten mixture of metal halides consisting of 35 mol per cent zinc chloride and 65 mol per cent aluminum chloride. The operating conditions and results are shown in the following table.

| | |
|---|---|
| Temperature, ° C | 125 |
| Time, hours | 2 |
| $H_2$ pressure, atm | 25 |
| Charge: | |
| Cyclohexane, cc | 196 |
| Cyclohexane, grams | 148.8 |
| Catalyst, grams | 8.4 |
| HCl, grams | 11 |
| Recovery, grams: | |
| Condensables | 6 |
| Overhead | 116.0 |
| Total bottoms, grams | 82.1 |
| n-Octane added to isomerate, grams [1] | 74.2 |
| Bottoms from isomerate, grams | 7.9 |
| Loss+holdup (isomerate), grams | 18.9 |

Distillation of isomerate+n-Octane:

| Temperature, °C. | Cc. Over | Per Cent Over | $n_D^{20}$ | $d_4^{20}$ |
|---|---|---|---|---|
| 57 | 0 | 0 | 1.3942 | |
| 63 | 3 | 1.5 | | |
| 69 | 11 | 5.6 | | |
| 70 | 15 | 7.7 | 1.4069 | |
| 71 | 25 | 12.8 | | |
| 72 | 60 | 30.6 | 1.4100 | 0.750 |
| 74 | 75 | 38.3 | 1.4166 | 0.762 |
| 79 | 100 | 51.0 | | |
| 80 | 120 | 61.2 | 1.4254 | |
| 81 | 143 | 73.0 | 1.4261 | 0.783 |
| 85 | 151 | 77.0 Botts | 1.3999 | 0.709 |

[1] n-Octane added as distillation "chaser" to permit complete vaporization of isomerate.

The analysis of the isomerate indicated that approximately 40% of the cyclohexane was converted to methyl cyclopentane.

Example III

A 108–250° F., 45 octane number straight run naphtha was isomerized in several batch experiments in the presence of a molten metal halide mixture consisting of 35 mol per cent zinc chloride and 65 mol per cent aluminum chloride. The operating conditions and results of the experiments are shown in the following table.

| | | | |
|---|---|---|---|
| Temperature, ° C | 130 | 130 | 130 |
| Time, Hours | 6 | 6 | 6 |
| Wt. Per Cent Catalyst | 5.7 | 10.6 | 6.0 |
| Wt. Per Cent HCl | 2.8 | 2.6 | 3.8 |
| Hydrogen Pressure, Atm | 67 | 67 | 67 |
| Products, Wt. Per Cent of Chg.: | | | |
| Gas [1] | 12.0 | 16.5 | 15.7 |
| $C_5$+ | 80.8 | 74.0 | 78.4 |
| O. N. | 55.5 | 59.5 | 57.5 |
| Lower Layer+Loss | 12.9 | 20.2 | 11.8 |

[1] Charging stock contained 3.2% dissolved gas.

It can be seen that contacting the straight run naphtha with my catalyst brought about an appreciable enhancement of the octane number.

Example IV

Two batch experiments were made at temperatures of 125 and 200° C. with a powdered mixture comprising 36% aluminum chloride and 64% zinc chloride, which is solid below about 225° C. (see Figure 1). The operating conditions and results are shown below. For purposes of comparison, the results obtained when using a catalyst containing 65% aluminum chloride and 35% zinc chloride are included in the table.

| Catalyst: | | | |
|---|---|---|---|
| Composition | 36% AlCl₃ | 64% ZnCl₂ | 65% AlCl₃, 35% ZnCl₂ |
| Weight, g | 5.2 | 4.5 | 5.9 |
| Temperature, °C | 125 | 200 | 125 |
| Time, Hours | 4 | 4 | 4 |
| Normal Butane, g | 55 | 56 | 56 |
| Hydrogen Chloride, g | 5 | 4 | 5 |
| Hydrogen, Atm | 25 | 25 | 25 |
| Products, Mol Per Cent: | | | |
| C₃H₈ | ---- | 0.0 | 4.2 |
| i-C₄H₁₀ | 0.0 | 2.2 | 45.8 |
| n-C₄H₁₀ | 100.0 | 97.1 | 49.3 |
| C₅+ | ---- | 0.7 | 0.7 |

It is evident that the mixture containing a minor proportion of aluminum chloride had virtually no isomerizing activity even at 200° C.; whereas a mixture containing a major proportion of aluminum chloride showed a high degree of activity.

I claim as my invention:

1. An isomerization process which comprises subjecting an isomerizable saturated hydrocarbon, at an isomerizing temperature below about 200° C., to the action of a catalyst comprising a mixture of a major mol proportion of an aluminum halide and a minor mol proportion of a zinc halide, said halides being so proportioned that the mixture is molten at said isomerizing temperature.

2. The process of claim 1 further characterized in that the isomerizable saturated hydrocarbon comprises a paraffin containing more than three carbon atoms.

3. The process of claim 1 further characterized in that the isomerizable saturated hydrocarbon comprises a cycloparaffin having at least six carbon atoms in the molecule and containing at least five carbon atoms in the ring.

4. An isomerization process which comprises subjecting an isomerizable saturated hydrocarbon, at an isomerizing temperature below about 200° C., to the action of a catalyst comprising a mixture of a major mol proportion of aluminum chloride and a minor mol proportion of zinc chloride, said halides being so proportioned that the mixture thereof is molten at said isomerizing temperature.

5. The process of claim 4 further characterized in that the isomerizable saturated hydrocarbon comprises a paraffin containing more than three carbon atoms.

6. The process of claim 4 further characterized in that the isomerizable saturated hydrocarbon comprises a cycloparaffin having at least six carbon atoms in the molecule and containing at least five carbon atoms in the ring.

HERMAN S. BLOCH.

REFERENCES CITED

The following references are of record in the file of this patent:

UNITED STATES PATENTS

| Number | Name | Date |
|---|---|---|
| 2,250,410 | Van Peski | July 22, 1941 |
| 2,346,768 | Laughlin | Apr. 18, 1944 |

OTHER REFERENCES

Moldavskii: J. Gen. Chem. (U. S. S. R.), vol. 5, Ser. A, 1791–97 (1935) Translation in Eng., 10 pages.